United States Patent
Budapanahalli (10) Patent No.: US 8,457,773 B2
(45) Date of Patent: Jun. 4, 2013

(54) MODULAR MANIFOLD SYSTEM (75) Inventor: Dinesh Budapanahalli, Pebble Bay (SG)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 111 days.

(21) Appl. No.: 13/003,974

(22) PCT Filed: Jul. 13, 2009

(86) PCT No.: PCT/US2009/050347
§ 371 (c)(1),
(2), (4) Date: Jan. 23, 2011

(87) PCT Pub. No.: WO2010/009023
PCT Pub. Date: Jan. 21, 2010

(65) Prior Publication Data
US 2011/0123668 A1    May 26, 2011

Related U.S. Application Data (60) Provisional application No. 61/081,428, filed on Jul. 17, 2008.

(51) Int. Cl.
*G06F 19/00* (2011.01)
(52) U.S. Cl.
USPC ........... 700/98; 264/328.8; 425/572; 700/200
(58) Field of Classification Search
USPC ................... 425/572; 264/328.8; 700/98, 210
See application file for complete search history.

(56) References Cited

U.S. PATENT DOCUMENTS

| | | | |
|---|---|---|---|
| 4,761,343 | A | 8/1988 | Gellert |
| 7,236,841 | B2 | 6/2007 | Fischer et al. |
| 7,287,977 | B2 | 10/2007 | Serniuck et al. |
| 2006/0228442 | A1 | 10/2006 | Fischer et al. |
| 2008/0131554 | A1 | 6/2008 | Fu |

FOREIGN PATENT DOCUMENTS

JP    4008522 A    1/1992

OTHER PUBLICATIONS

Mold Masters pamphlet entitled Your Connection! . . . To Injection Molding Excellence: Modular Manifolds, Apr. 1986.*

* cited by examiner

*Primary Examiner* — Tim Heitbrink (57) ABSTRACT

A method of manufacturing a manifold assembly (22) in accordance with specifications required by a mold is provided. The method includes selecting a manifold (22) from a predetermined set of manifolds (22) and sub-manifolds (24) selected from a predetermined set of sub-manifolds (24). Both the manifolds (22) and the sub-manifolds (24) are at least partially manufactured to define first and second portions of the melt channels (28). Injection nozzles (26) are also selected for each sub-manifold (24), defining third portions of the melt channels (28). The manifold (22), the at least one sub-manifold (24) and the injection nozzles (26) are arranged and assembled together so that the first portions, the second portions and the third portions of the melt channels (28) cooperatively define the melt channels (28) operable to direct a melt material to gates located in the mold. The invention further includes a manifold assembly manufactured using the methods described herein.

8 Claims, 7 Drawing Sheets

MODULAR MANIFOLD SYSTEM

TECHNICAL FIELD

The present invention relates to injection molding technology. More specifically, the present invention relates to the manifold assemblies for hot runner systems.

BACKGROUND OF THE INVENTION

Hot runner manifold systems are utilized to transfer melt material, typically plastic resin, from an injection molding machine to a mold. Hot runner manifold systems typically include a manifold plate, a manifold housed in the manifold plate, and a backing plate that supports the manifold and manifold plate. The manifold system routes melt material from a central sprue, which connects to an injection unit on an injection molding machine, to a plurality of injection nozzles which inject the melt material into cavities in the mold. The manifold system divides the flow of the melt material into several branches (or "melt channels") as it flows from the central sprue to the nozzles.

Hot runner manifold systems are typically produced according to exact customer specifications, and require several days to manufacture. U.S. Pat. No. 7,236,841 to Fischer and Babin (hereafter, the '841 patent) teaches a method and apparatus for reducing the amount of time required to manufacture a custom hot runner manifold system. As is shown in FIG. 37 of the '841 patent, a manifold plate is, prior to being ordered, partially pre-manufactured, with its central sprue and melt channels pre-drilled. Once an exact specification is received, a partially-pre-manufactured manifold is selected from the existing inventory. Holes are then drilled into the manifold to attach the injection nozzles.

SUMMARY OF THE INVENTION

According to a first aspect of the present invention, there is provided a method of manufacturing a manifold assembly in accordance with specifications required by a mold, comprising:
  selecting a manifold from a predetermined set of manifolds, the manifold being at least partially manufactured to define first portions of melt channels;
  selecting at least one sub-manifold from a predetermined set of sub-manifolds, the at least one sub-manifold being at least partially manufactured to define second portions of the melt channels;
  selecting injection nozzles for each of the at least one sub-manifold, the injection nozzles defining third portions of the melt channels; and
  arranging and assembling together the manifold, the at least one sub-manifold and the injection nozzles so that the first portions, the second portions and the third portions of the melt channels cooperatively define the melt channels operable to direct a melt material to gates located in the mold.

According to a second aspect of the present invention, there is provided a manifold assembly for a hot runner system, comprising:
  a manifold selected from a predetermined set of manifolds, the manifold defining first portions of melt channels;
  at least one sub-manifold selected from a predetermined set of sub-manifolds, connected to the manifold by an interface, the at least one sub-manifold defining second portions of the melt channels;
  at least one injection nozzle selected from a predetermined set of injection nozzles, connected to the at least one sub-manifold and defining third portions of the melt channels;
  the manifold, the at least one sub-manifold and the at least one injection nozzle cooperatively defining melt channels in accordance with specifications required by a mold; and
  wherein each of the manifold and the at least one sub-manifold are at least partially-manufactured prior to their selection for the manifold assembly.

BRIEF DESCRIPTION OF THE DRAWINGS

Exemplary embodiments of the present invention will now be described with reference to the accompanying drawings in which.

DETAILED DESCRIPTION OF THE PREFERRED EMBODIMENT(S)

In the following detailed description, numerous specific details are set forth in order to provide a thorough understanding of the invention. However, it will be understood by those skilled in the art that the present invention may be practiced without these specific details. For example, well-known methods, procedures, and components have not been described in detail so as not to obscure the present invention.

Figure 1:
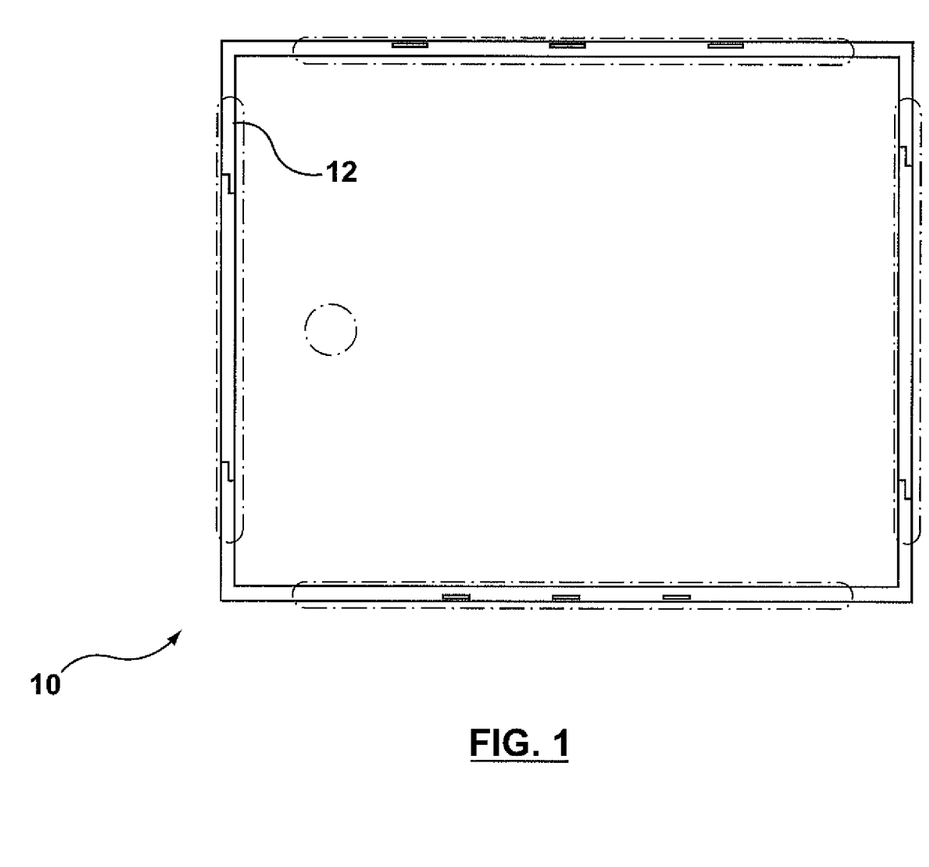
FIG. 1 is a top plan view of a molded frame for an LCD.

FIG. 1 shows a frame at 10 for a liquid crystal display (LCD), typically used in a computer display or a television. As is well known to those of skill in the art, LCD frames come in a wide range of sizes, typically in either standard profile (4:3) or widescreen profile (16:9) aspect ratios. For instance, 15" frames (measured on the diagonal) are popular for laptops, whereas television applications typically come in significantly larger sizes. The molds for frames 10 typically have a plurality of gates (not shown) distributed around the frame's perimeter to provide access for the melt material provided by injection nozzles (not shown). The portions 12 around the frames 10 indicate potential gate locations for the frame. By changing the locations of the gates, different properties (such as material strength) can be achieved in different portions of the frame. For typical laptop frames (ranging up to 21"), 4, 8 or 12 gates 12 (and a corresponding number of injection nozzles) are used.

FIGS. 2-11 show a manifold assembly a hot runner system adapted to produce a frame for a liquid crystal display (LCD) of differing sizes in accordance with a mold specification. Each manifold assembly comprises a manifold, and at least one sub-manifold (typically 2 or 4 sub-manifolds). At least one injection nozzle is mounted to each sub-manifold, and is operable to deliver melt through a gate in a mold to produce a molded article.

Figure 2:
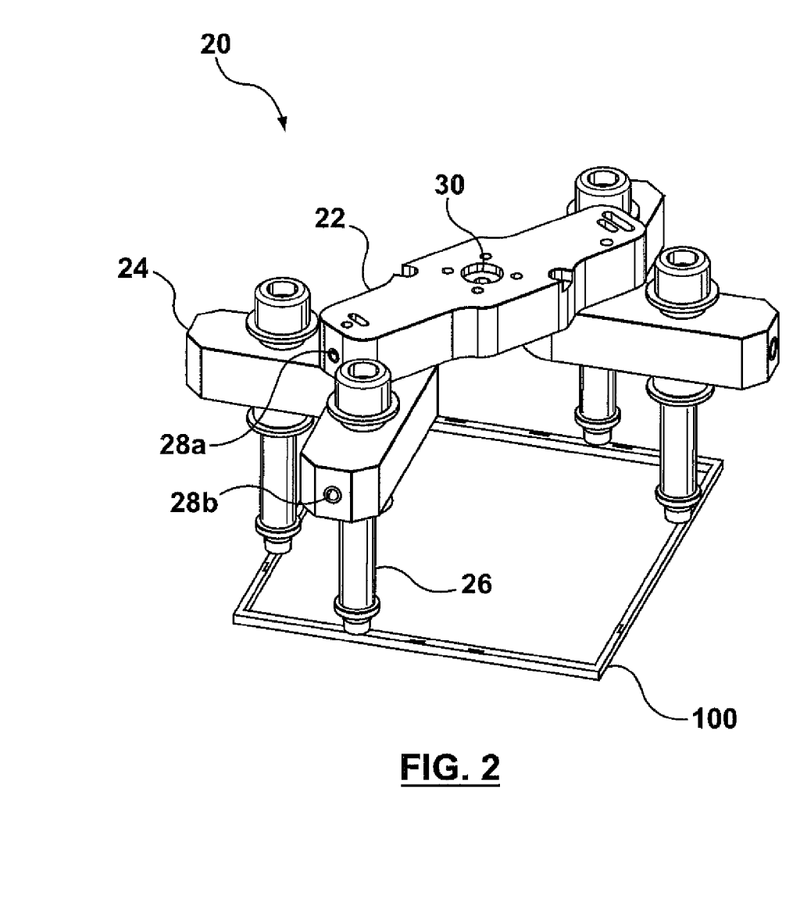
FIGS. 2 and 3 are, respectively, perspective and top plan views of a manifold assembly for manufacturing a frame having four injection nozzles, in accordance with an embodiment of the invention.
Figure 3:
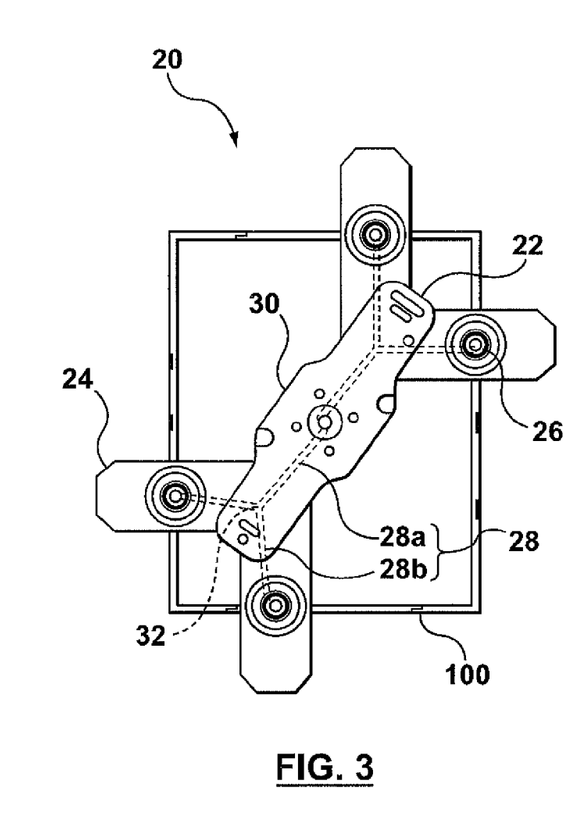

Referring now to FIGS. 2 and 3, a manifold assembly for a 15" frame 100 for an LCD is shown generally at 20. For the purposes of clarity, the mold has not been illustrated. Manifold assembly 20 includes a manifold 22, a pair of V-shaped sub-manifolds 24, located on opposing sides of manifold 22 and an injection nozzle 26 located within a hole on each arm of the sub-manifolds 24. The position and angle of sub-manifold 24 relative to manifold 22 is maintained via structural pins, or dowels (not shown). Other means of maintaining the relationship between sub-manifold 24 and manifold 22 will occur to those of skill in the art. The manifold assembly 20 is surrounded by a backing plate (not shown) and a manifold plate (also not shown), so that the manifold assembly 20 is, in effect, sandwiched therebetween.

Manifold 22 and sub-manifolds 24 collectively define a plurality of melt channel 28 though which melt material reaches each injection nozzle 26. A central sprue 30 delivers melt from a central supply (not shown) to first portions of melt channel 28 (hereafter, melt channels 28a) located within the manifold 22. Second portions of each melt channel 28 (hereafter, melt channels 28b) are located within the sub-manifolds 24, and direct the melt to third portions of the melt channels 28 defined in the injection nozzles 26, where it is delivered to all the gates of the mold (not shown).

As can be seen in FIG. 3, melt channels 28b meet at an intersecting point within each sub-manifold 24. An interface 32 is defined between manifold 22 and each of the sub-manifolds 24 at a location over the intersecting point so that the melt material travels freely (or "drops") from the melt channels 28a to melt channels 28b. The location of interface 32 on manifold 22 can potentially be anywhere along the length of melt channel 28a, but is determined based upon the required specifications of the mold (described in greater detail below). In the presently-illustrated embodiment, interface 32 comprises cooperating apertures on manifold 22 and sub-manifold 24. In the presently-illustrated embodiment, interface 32 comprises apertures drilled into manifold 22 and sub-manifold 24 that are generally perpendicular to, and provide fluid communication therebetween melt channels 28a and 28b. In the presently-illustrated embodiment, interface 32 further includes a generally L-shaped bushing (not shown) inserted into melt channel 28 that directs the flow of the melt from melt channel 28a into melt channel 28b (rather than continuing through the manifold 22. Melt then passes through each of the melt channels 28 to the injection nozzles 26.

Figure 4:
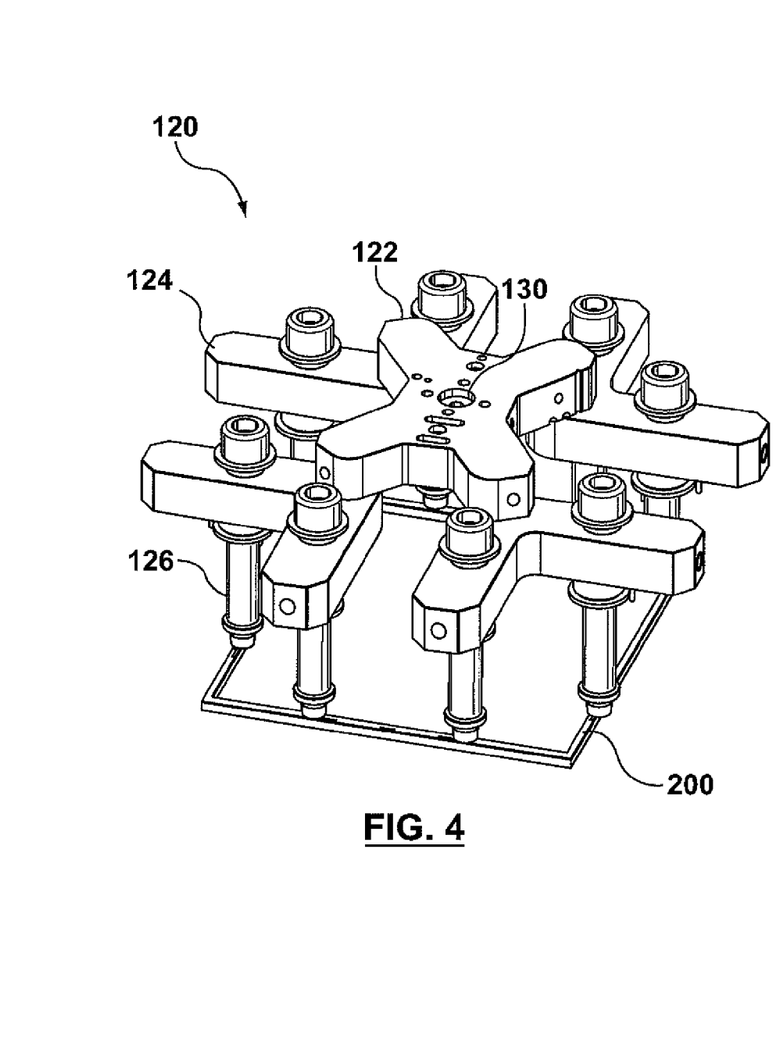
FIGS. 4 and 5 are, respectively, perspective and top plan views of another manifold assembly for manufacturing a frame having eight injection nozzles, in accordance with another embodiment of the invention.
Figure 5:
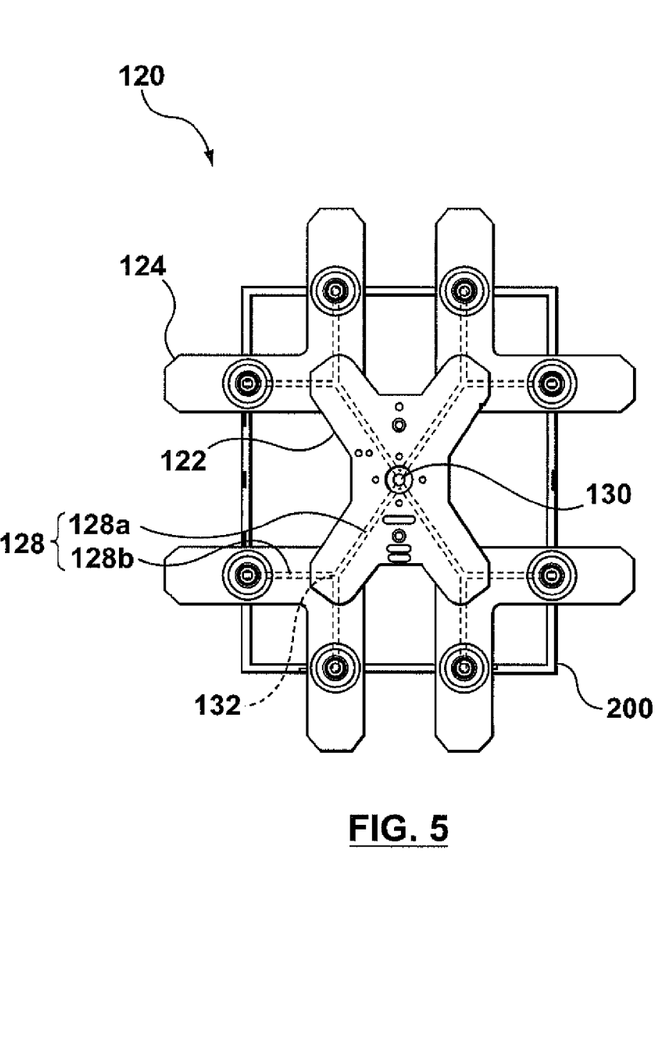

Referring now to FIGS. 4 and 5, a manifold assembly for a 17" frame 200 for an LCD is shown generally at 120. The manifold assembly 120 is similar to manifold assembly 20, and includes an X-shaped manifold 122, four V-shaped sub-manifolds 124, located on each of the ends of manifold 122 and an injection nozzle assembly 126 depending from each arm of the sub-manifolds 124. The X-shaped manifold 122 distributes the melt from central sprue 130 along four melt channels 128a to interfaces 132, and then through melt channels 128b to injection nozzle assemblies 126.

Figure 6:
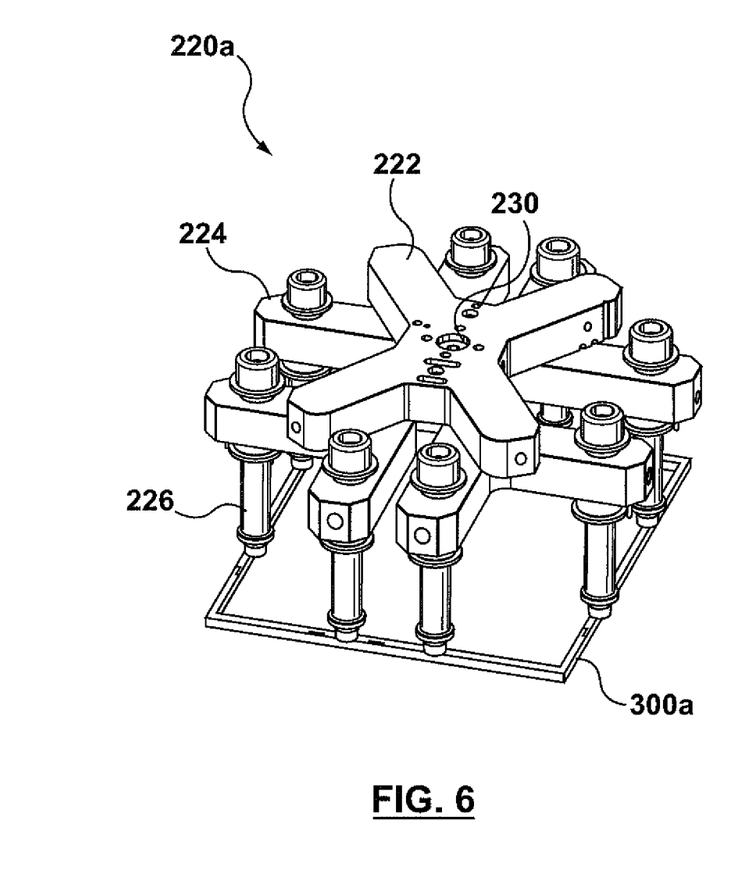
FIGS. 6 and 7 are, respectively, perspective and top plan views of another manifold assembly for manufacturing a frame having eight injection nozzles, in accordance with another embodiment of the invention.
Figure 7:
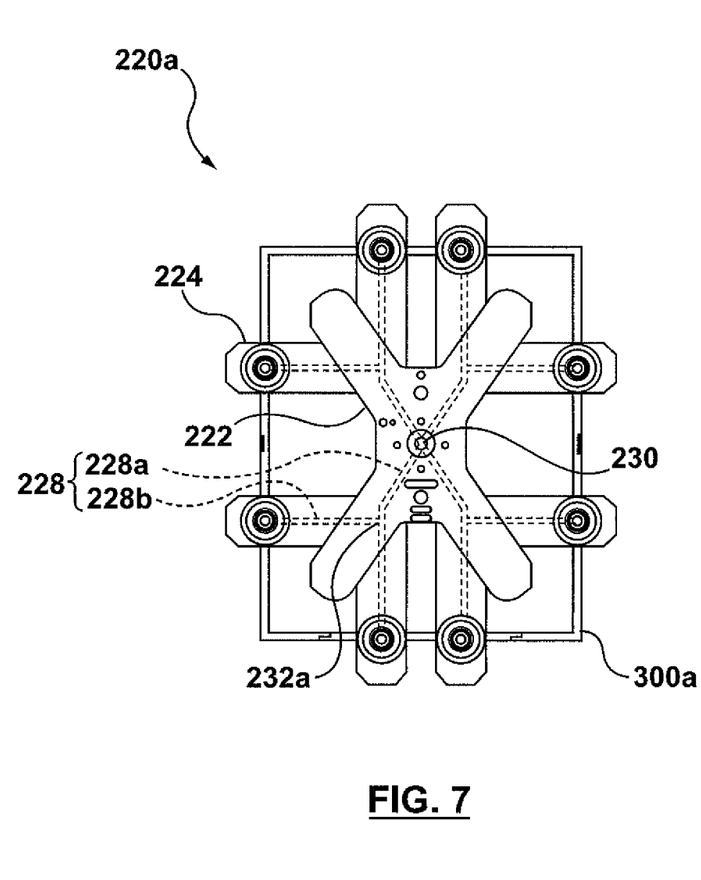

Referring now to FIGS. 6 and 7, a manifold assembly for a 19" frame 300a for an LCD is shown generally at 220a. The manifold assembly 220a is similar to manifold assembly 20, and includes an X-shaped manifold 222, four V-shaped sub-manifolds 224, located on each of the ends of manifold 222 and an injection nozzle assembly 226 depending from each arm of the sub-manifolds 224. The X-shaped manifold 222 distributes the melt from central sprue 230 along four melt channels 228a to interfaces 232a, and then through melt channels 228b to injection nozzle assemblies 226. The interface 232a between melt channels 228a and 228b is defined proximate the distal ends of cross manifold to 222a. The injection nozzle assembly 226 depends from each arm of the sub-manifolds 224a proximate the interface 232a.

Figure 8:
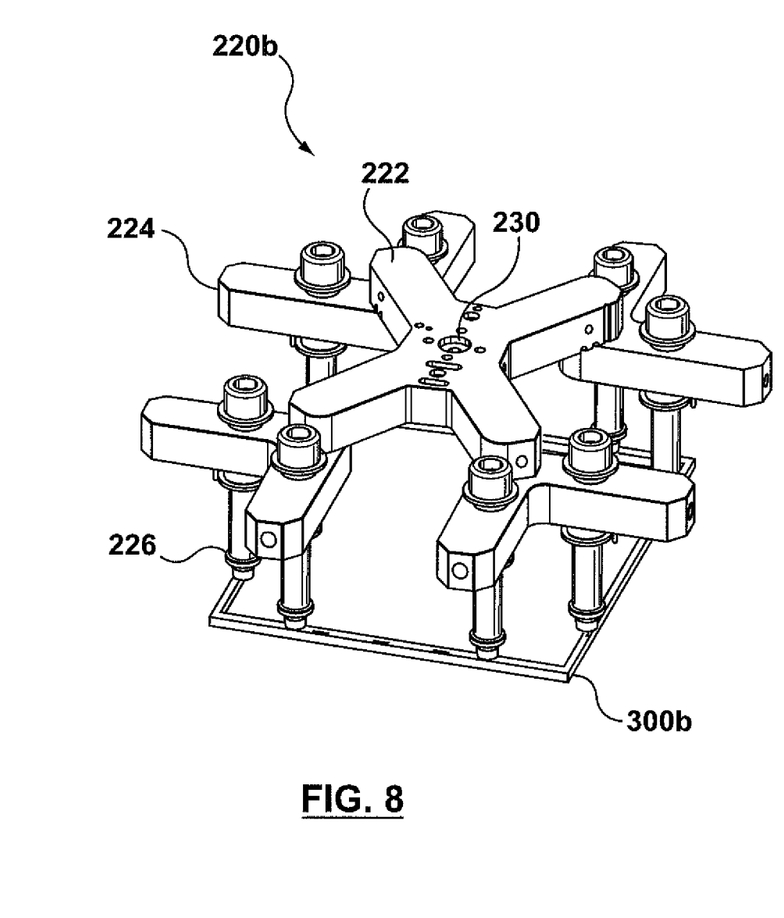
FIGS. 8 and 9 are, respectively, perspective and top plan views of another manifold assembly for manufacturing a frame having eight injection nozzles, in accordance with another embodiment of the invention.
Figure 9:
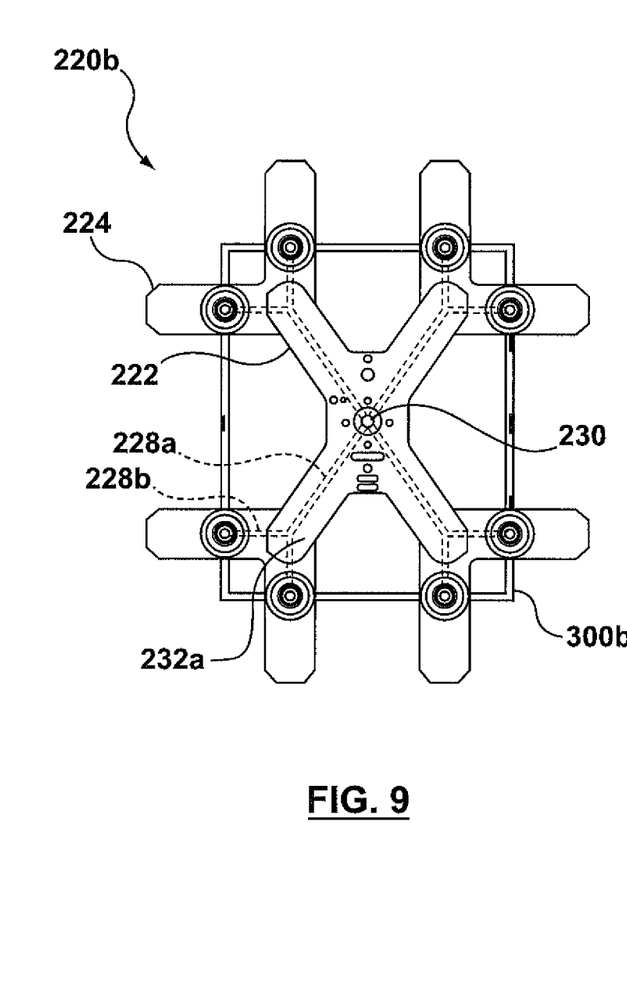

Referring now to FIGS. 8 and 9, an alternative manifold assembly for a 19" frame 300b for an LCD is shown generally at 220b. The manifold assembly 220b is similar to manifold assembly 20, and includes an X-shaped manifold 222 (the same manifold 222 as is used for manifold assembly 300a), four V-shaped sub-manifolds 224 (the same sub-manifolds 224 as used for manifold assembly 300a), located on each of the ends of manifold 222 and an injection nozzle assembly 226 depending from each arm of the sub-manifolds 224. The X-shaped manifold 222 distributes the melt from central sprue 230 along four melt channels 228a to interfaces 232b, and then through melt channels 228b to injection nozzle assemblies 226. However, the arrangement of the sub-manifolds 224 relative to the manifold 222 and the location of the interface 232 are different than with manifold assembly 220a. Each interface 232a is defined midway along each of the arms of cross manifold 222 rather than at the distal ends. Additionally, the injection nozzle assemblies 226 depend from each arm of the sub-manifolds 224 proximate the distal ends of each arm of the sub-manifolds 224.

It will thus become apparent that while manifold assemblies 220a and 220b both produce a 19" LCD frame using substantially similar components, the distribution of the nozzle assemblies 226 around the frames differ, changing the locations of the gates (and thus, melt channel length). Thus, manifold assemblies 220a and 220b will produce LCD frames having different mechanical properties.

Figure 10:
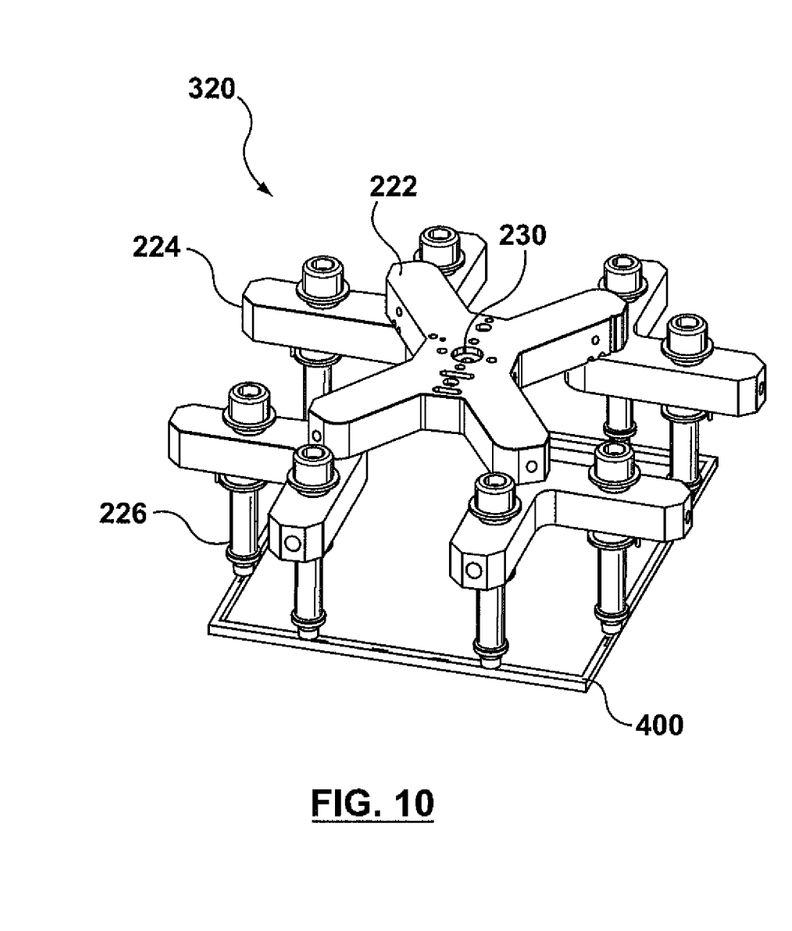
FIGS. 10 and 11 are, respectively, perspective and top plan views of another manifold assembly for manufacturing a frame having eight injection nozzles, in accordance with another embodiment of the invention.
Figure 11:
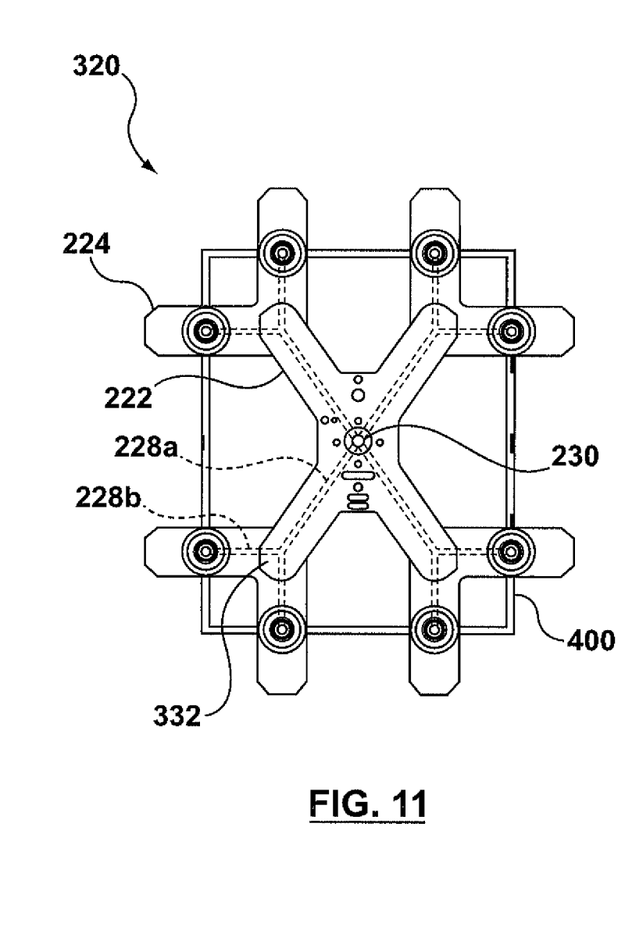

Referring now to FIGS. 10 and 11, a manifold assembly for a 21" frame 400 for an LCD is shown generally at 320. Manifold assembly 320 includes the same cross manifold 222, and four of the same sub-manifolds 224 as are used in manifold assemblies 220a and 220b. An interface 332 is defined near the distal end of each arm of cross manifold 222. To locate the nozzle assemblies correctly over the frame 400, the nozzle assemblies are located further along melt channel 228b from interface 332. Thus, by moving the location of the interface along the melt channel within the manifold, and by moving the location of the nozzle assemblies within the sub-manifolds, it is possible to produce molded articles having deferring dimensions using substantially the same components.

A method of manufacturing and assembly manifold assemblies in accordance with an embodiment of the invention will now be described. Manufacturing and assembly of manifold assemblies 20, 120, 220a, 220b, and 300 etc. typically occur using a 'finish-to-order' (FTO) process. That is to say, manifolds 22, 122, 222, etc. are partially manufactured in batch quantities, but left unfinished. During the construction of manifolds 22, 122, 222, etc. melt channels 28a, 128a, 228a are typically drilled within the arms of the manifold towards their respective central sprue 30, 130, 230, etc. Optionally, a to distal end of melt channel 28a, 128a, 228a, is filled with a plug. Sub-manifolds 24, 124, 224, etc. are also manufactured, at least partially, in batch quantities, with melt channels 28b, 128b, 228b, being drilled through to their intersecting point.

Figure 12:
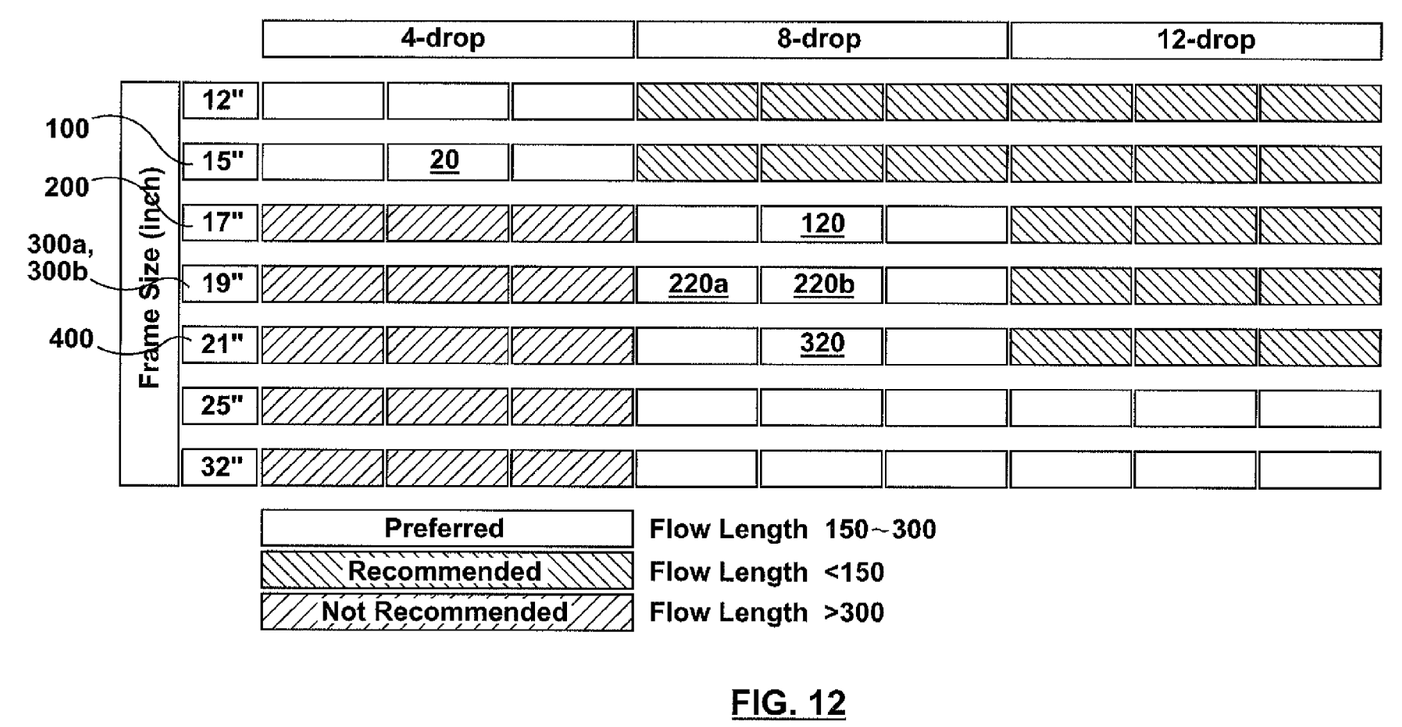
FIG. 12 provides a table showing different possible manifold assemblies for manufacturing a frame of differing sizes.

Upon receiving an order for a manifold assembly required to meet certain the specifications of a particular mold design (requirements for flow length, placement of the mold gates, etc.), a manifold assembly (such as, but not limited to, manifold assemblies 20, 120, 220a, 220b, 320, etc.) is assembled using these partially-manufactured components. For commonly-used mold specifications, a table can be provided that lists preferred configurations. FIG. 12 shows a table listing popular configurations for a manifold assembly used to manufacture frames 100, 200, 300a, 300b, 400, etc. Using a particular frame size, and a particular number of injection nozzles, (i.e., number of 'drops'), one can select a manifold assembly (20, 120, 220a, 220b, 320, etc.) having a desired melt channel length (i.e., "flow length").

Once the manifold assembly is selected, a manifold for that manifold assembly is selected from a predetermined set of manifolds 22, 122, 222, etc. Depending on the number of drops required, a plurality of sub-manifolds are also selected from a predetermined set of sub-manifolds 24, 124, 224, etc. Injection nozzles 26, 126, 226, etc. are also chosen, based upon requirements determined by the mold and the melt material.

After selecting the manifold and sub-manifolds, apertures are drilled into the manifold 22, 122, 222, etc. to intersect, in a perpendicular fashion, with melt channel 28a, 128a, 228a, etc, at a location on each melt channel 28a, 128a, 22a, relative to the central sprue to define each first portion of interface 32, 132, 232a, 232b, 332, etc. An aperture is also drilled into each sub-manifold 24, 124, 224, etc. to intersect, in a perpendicular fashion the intersection point of melt channels 28b, 128b, 228b, etc. to define a second portion of interface 32, 132, 232a, 232b, 332, etc. An additional hole is drilled into the arm of each sub-manifold 24, 124, 224 in order to mount a injection nozzles 26, 126, 226, etc. at a predetermined location along each melt channel 28b.

After defining the complementary portions of the interfaces 32, 132, 232a, 232b, 332, etc., final assembly of the desired manifold assembly 20, 120, 220a, 220b, 320, etc. occurs. The sub-manifolds are mounted to the manifold (in a fashion known to those of skill in the art), so that their respective portions of interface 32, 132, 232a, 232b, 332, etc. are mated together (with the bushings inserted), thereby providing fluid communication between melt channels 28a, 128a, 228a, etc. and 28b, 128b, 228b, etc. Injection nozzles 26, 126, 226, etc. are mounted with the holes on each arm of the sub-manifolds (also in a fashion known to those of skill in the art) so that they extend to the desired gate locations for frames 100, 200, 300, etc.

The location of the apertures on the manifold 22, 122, 222, etc. combined with the location of the holes on the sub-manifolds 24, 124, 224, etc. (along with the injection nozzles chosen), will determine the total length of melt channels 28, which are sized so that injection nozzles 26, 126, 226, etc. align with the gates for the mold. Since the interface 32, 132, 232a, 232b, 332, etc. can be located at any one of many possible locations along the sub-manifolds 24, 124, 224, etc., and the location of the injection nozzles 26, 126, 226, etc. can also be located at any one of many possible locations along each arm of sub-manifold 24, 124, 224, etc., each combination of a particular manifold and sub-manifolds (with the correct mold) can produce a range of frame sizes and/or aspect ratios. Additionally, by moving the location of interface 32, 132, 232a, 232b, 332, etc., along the length of melt channel 28a, 128a, 228a, etc., the distribution of the gates around the frame can be adjusted.

It is contemplated by the inventors that in an alternate embodiment of the invention, the manufacturer could drill multiple holes into the manifold along the melt channel to better accommodate different sized molded articles. Unused holes would simply be fitted with plugs to prevent melt leakage. It is further contemplated by the inventors that in an alternate embodiment of the invention, the sub-manifolds 24, 124, 224, etc. are produced in batch quantities, but are in a finished state. Manifold-assemblies simply choose which sub-manifolds are to be mounted to the main manifold.

Although the presently-illustrated embodiments of the invention are directed towards manifold assemblies used to produce frames for LCD displays, those of skill in the art will recognize that the manifold assemblies taught herein and means for production thereof can be directed towards other molded articles without departing from the scope of the invention.

It is also contemplated by the inventors that to best optimize the benefits of a modular manifold system, the manifold plate should also be adjustable. U.S. patent application Ser. 12/039824 to Baumann et al., entitled "Flexible Plate Slot for a Hot Runner Injection Molding system", teaches a system of flexible manifold plates compatible with the above described manifold assemblies, and is incorporated herein in by reference.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and to equivalent structures and functions.

What is claimed is:

1. A method of manufacturing a manifold assembly to produce a frame in accordance with specifications required by a mold, comprising:
   selecting a manifold from a predetermined set of manifolds, the manifold being at least partially manufactured to define first portions of melt channels;
   selecting at least one V-shaped sub-manifold from a predetermined set of sub-manifolds, the at least one V-shaped sub-manifold being at least partially manufactured to define second portions of the melt channels;
   selecting injection nozzles for each of the at least one V-shaped sub-manifold, the injection nozzles defining third portions of the melt channels; and
   arranging and assembling together the manifold, the at least one V-shaped sub-manifold and the injection nozzles so that the first portions, the second portions and the third portions of the melt channels cooperatively define the melt channels operable to direct a melt material to gates located in the mold,
   wherein assembling the manifold assembly includes:
   selecting a frame size and the distribution of the gates around the frame;
   defining an interface between the manifold and the at least one V-shaped sub-manifold at one location of a plurality of possible locations on the manifold based on the selecting the frame size and the distribution of the gates around the frame; and
   mounting one of the injection nozzles to an arm of the at least one V-shaped sub-manifold at one location of a plurality of possible locations on the arm of the at least one V-shaped sub-manifold based on the selecting the frame size and the distribution of the gates around the frame.

2. The method of claim 1, wherein assembling the manifold assembly includes defining an interface between the first portions and the second portions of the melt channels at a location in accordance with the specifications required by the mold, the location of the interface on the manifold and the at least one V-shaped sub-manifold being determined by the specifications required by the mold.

3. The method of claim 2, wherein the interface comprises cooperating apertures located in the manifold and the at least one V-shaped sub-manifold.

4. The method of claim 3, wherein the interface further comprises a bushing located within each cooperating aperture operable to direct the melt material from the first portions of the melt channels into the second portions of the melt channels.

5. The method of claim 1, wherein each of the injection nozzles is mounted to the at least one V-shaped sub-manifold at a location determined by the specifications required by the mold.

6. The method of claim 1, wherein, prior to assembly, the first portions of the melt channels are drilled through arms of the manifold into a central sprue defined in the manifold.

7. The method of claim 2, wherein, prior to assembly, the second portions of the melt channels are drilled through arms on the at least one V-shaped sub-manifold towards an intersecting point.

8. The method of claim 7, wherein the portion of the interface located within the at least one V-shaped sub-manifold is drilled prior to selection of the at least one V-shaped sub-manifold for use in the manifold assembly being manufactured.

* * * * *